United States Patent
Raven et al.

(10) Patent No.: US 10,052,715 B2
(45) Date of Patent: Aug. 21, 2018

(54) ROTARY FRICTION WELDING

(71) Applicant: ROLLS-ROYCE plc, London (GB)

(72) Inventors: Gemma Raven, Royston (GB); Simon E Bray, Derby (GB); Andrew R Walpole, Derby (GB)

(73) Assignee: ROLLS-ROYCE plc, London (GB)

( * ) Notice: Subject to any disclaimer, the term of this patent is extended or adjusted under 35 U.S.C. 154(b) by 56 days.

(21) Appl. No.: 15/298,046

(22) Filed: Oct. 19, 2016

(65) Prior Publication Data

US 2017/0129048 A1 May 11, 2017

(30) Foreign Application Priority Data

Nov. 10, 2015 (GB) .................................. 1519805.4

(51) Int. Cl.
*B23K 20/12* (2006.01)
*B23K 20/24* (2006.01)
(Continued)

(52) U.S. Cl.
CPC ............ *B23K 20/129* (2013.01); *B23K 20/12* (2013.01); *B23K 20/22* (2013.01); *B23K 20/24* (2013.01);
(Continued)

(58) Field of Classification Search
CPC ...... B23K 20/129; B23K 20/24; B23K 20/22; B23K 2203/18; B23K 2201/001; B23K 20/12–20/1215; B23K 20/1285–20/1295
(Continued)

(56) References Cited

U.S. PATENT DOCUMENTS 4,944,977 A * 7/1990 Shantz ................. B23K 20/129
                                                             138/89
5,551,623 A 9/1996 Collot et al.
(Continued)

FOREIGN PATENT DOCUMENTS

EP       0 486 755 A2    5/1992
EP       0 850 718 A1    7/1998
(Continued)

OTHER PUBLICATIONS

Mar. 29, 2017 Search Report issued in European Patent Application No. 16 19 4097.
(Continued)

*Primary Examiner* — Kiley S Stoner
(74) *Attorney, Agent, or Firm* — Oliff PLC

(57) ABSTRACT

A method for welding together pieces which form a curved or angled end product using a friction welding process. The method includes: providing first and second pieces which together define the end product geometry, each piece including an end product geometry portion and a sacrificial weld portion, the sacrificial weld portion forming a dog-leg relative to the end product geometry portion and terminating in a planar weld interface surface. The pieces are arranged with their planar weld interface surfaces together at a weld surface interface and the sacrificial weld portions in coaxial alignment. Mechanical friction is applied between the planar weld interface surfaces sufficient to plastically deform the sacrificial weld portions. An axial force is applied along the co-axis of the sacrificial weld portions sufficient to upset the sacrificial weld portions and bring together the end product geometry portions. The sacrificial geometry portions are removed to provide the end product.

16 Claims, 5 Drawing Sheets

(51) Int. Cl.
*B23K 20/22* (2006.01)
*B23K 101/00* (2006.01)
*B23K 103/18* (2006.01)

(52) U.S. Cl.
CPC .... *B23K 2201/001* (2013.01); *B23K 2203/18* (2013.01)

(58) Field of Classification Search
USPC .......... 228/1.1, 110.1, 2.1–2.3, 112.1–114.5; 156/73.1–73.6, 580.1–580.2
See application file for complete search history.

(56) References Cited

U.S. PATENT DOCUMENTS

| | | | | |
|---|---|---|---|---|
| 7,441,690 | B2* | 10/2008 | Shiotsuki | B23K 20/12 228/112.1 |
| 9,869,189 | B2* | 1/2018 | Mottin | F01D 5/3061 |
| 2002/0127108 | A1* | 9/2002 | Crall | B23K 20/129 416/213 R |
| 2009/0108051 | A1* | 4/2009 | Bamberg | B23K 20/1205 228/112.1 |
| 2010/0172761 | A1 | 7/2010 | Le Goff | |
| 2011/0206523 | A1 | 8/2011 | Konitzer et al. | |
| 2012/0099998 | A1* | 4/2012 | Moor | B23K 20/1205 416/213 R |
| 2012/0129389 | A1* | 5/2012 | Van Swearingen | B23K 20/129 439/578 |
| 2015/0021815 | A1* | 1/2015 | Albrecht | B05B 5/001 264/235 |
| 2016/0076376 | A1* | 3/2016 | Trickey | B23K 20/126 228/114 |
| 2016/0146024 | A1* | 5/2016 | Morris | F01D 5/3061 416/96 R |
| 2017/0014938 | A1* | 1/2017 | Berry | B23K 20/1205 |
| 2017/0022827 | A1* | 1/2017 | Waldman | F01D 5/3061 |

FOREIGN PATENT DOCUMENTS

| | | | | | |
|---|---|---|---|---|---|
| GB | 1140271 | A | * | 1/1969 | ........... B23K 20/129 |
| JP | 07284994 | A | * | 10/1995 | ......... B23K 20/1205 |

OTHER PUBLICATIONS

Jun. 2, 2016 Search Report issued in British Patent Application No. 1519805.4.

* cited by examiner

ROTARY FRICTION WELDING

TECHNICAL FIELD

The present invention relates to a rotary friction welding process. More particularly, the invention relates to a rotary friction welding process suited to the joining of parts to form an angled or curved product.

BACKGROUND TO INVENTION

Rotary friction welding is a process for welding together two bodies or workpieces by converting mechanical energy to heat energy by the friction between the engaging weld surfaces of the two workpieces. The process involves effecting relative rotation between the two workpieces while the weld surfaces remain in engagement with each other.

For example, in inertia friction welding one of two coaxial workpieces is attached to a flywheel, rotated to a predetermined speed and then driven against the second workpiece using thrust supplied by the welding machine. A fixed amount of stored energy in the flywheel (proportional to $rpm^2 \cdot I$, where rpm is the flywheel's predetermined speed and I is its rotational inertia) is thereby converted to heat by friction at the interface of the engaging weld surfaces, which bonds the workpieces together.

The initial contact between the weld surfaces produces a conditioning period in which friction raises the temperature at the interface. This is followed by upsetting when the temperature reaches a high enough level such that softening/melting of the workpiece material allows the workpieces to be pushed together, with material being expelled sideways from a plasticised zone at the interface as flash or "upset".

Problems arise when workpieces of generally circular cross section have non-uniform diameter, for example when together they form a product having an angled or curved circumferential wall. The application of a force in a direction orthogonal to the weld interface in these situations is likely to lead to slippage between the workpieces at the interface with the consequence of weld misalignment. US patent publication 2011/206523 discloses a process for welding co-axially aligned workpieces where the weld interface is angled to both the axis and the orthogonal. Application of both axial and radial force is proposed. It is understood this is necessary to control radial deformation arising from the inclination of the weld interface to the axis. Application of radial force to a pair of workpieces which are configured to form an angled or curved walled product is problematic using conventional rotary friction welding equipment.

STATEMENT OF INVENTION

In accordance with the present invention there is provided a method for welding together pieces which form a curved or angled walled end product using a friction welding process comprising;

providing first and second pieces which together define the end product geometry, each piece comprising an end product geometry portion and a sacrificial weld portion, the sacrificial weld portion forming a dog-leg relative to the end product geometry portion and terminating in a planar weld interface surface, arranging the pieces with their planar weld interface surfaces together at a weld surface interface and with the sacrificial weld portions in coaxial alignment, applying mechanical friction between the planar weld interface surfaces sufficient to plastically deform the sacrificial weld portions, applying an axial force along the co-axis of the sacrificial weld portions sufficient to upset the sacrificial weld portions and bring together the end product geometry portions, removing the flash to provide the end product.

The "dog-leg" in the context of this specification refers to an extension of the piece around a sharp bend, the vertex of which is in a plane which defines an end of the sacrificial weld portion. The plane may divide the sacrificial weld portion and the end product geometry portion. Alternatively the plane may be displaced from an end of the end product geometry portion, not all of the sacrificial geometry portion being upset in the welding process. In the latter case, the remaining sacrificial geometry portion can be removed in a post welding step. Since the end product is typically substantially circular in cross section, the dog-leg may also extend circumferentially. The dog-legs may extend in a direction which is coaxial with an axis of an end product which is circular in cross-section. The planar weld interface surfaces are desirably arranged to be orthogonal to an axis of an end product which is circular in cross-section.

The angle of the vertex is not critical but is desirably in the inclusive range 110-160 degrees, for example in the inclusive range 125 to 145 degrees, for example about 135 degrees.

Either or both of the first and second pieces may have an end product geometry portion which is results in a curved wall of the end product.

Whilst not essential, it can be beneficial for the sacrificial weld portions to exhibit symmetry across the weld surface interface. Advantageously, by mirroring the weld and sacrificial geometry portions across the line of initial contact, a similar heat-sink effect can be produced in each piece, this in turn allows the outward flow of expelled material from the weld to be controlled, reducing flow bias and helping to control inclination of weld plane.

The friction welding process may be an inertia, direct drive, or hybrid rotary friction welding process.

The first and second pieces may be formed of different materials, for example, different alloys.

Each sacrificial weld portion may be formed by machining the respective piece to include this portion or by build-up of a suitable material by a material addition process onto an already provided end geometry portion.

Sacrificial weld portions can be removed after welding by known machining methods.

BRIEF DESCRIPTION OF DRAWINGS

Embodiments of the invention will now be described by way of example with reference to the accompanying drawings in which:

FIG. 10 shows schematically a third example of an end product geometry to which the method of the present invention is well suited;

DETAILED DESCRIPTION OF DRAWINGS AND EMBODIMENTS

FIG. 1 shows examples of end products which are well suited to manufacture using a method in accordance with the present invention. In each of the FIGS. 1A to 1D, an axial centreline XX is shown as a reference. For example, the end products may have substantially circular cross sections of which line XX marks the centre and the figures represent an axial section through a wall of the end product. As can be seen, each of the end products in FIGS. 1A to 1D comprises two pieces 1a, 1b which can be seen to deviate in radius from the axis XX. Dotted line 2 represents a plane through which the pieces 1a, 1b would desirably be joined. For a good quality friction weld, the line 2 should be substantially orthogonal to the axis XX and the walls of pieces 1a, 1b in parallel alignment with the axis XX. It will be appreciated that none of the represented end products meets these two criteria. Consequently, an alternative method is required.

Figure 1A:
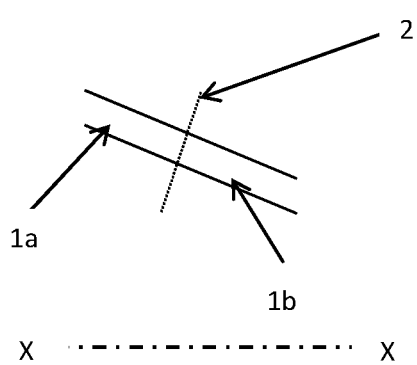
FIG. 1A shows schematically a first example of an end product geometry to which the method of the present invention is well suited.
Figure 1B:
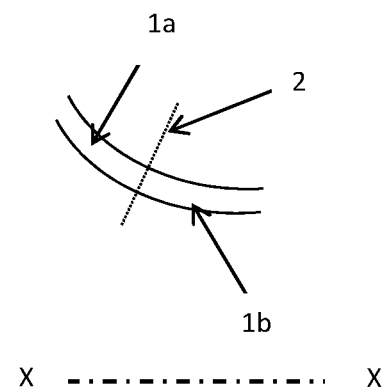
FIG. 1B shows schematically a second example of an end product geometry to which the method of the present invention is well suited.
Figure 1C:
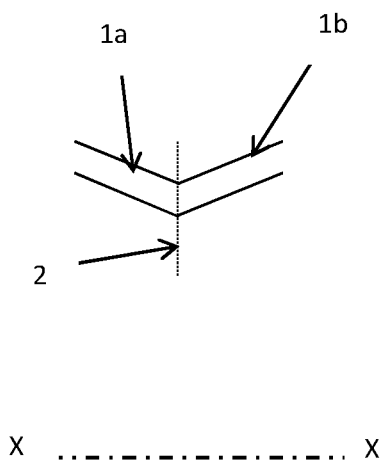
FIG. 1D shows schematically a fourth example of an end product geometry to which the method of the present invention is well suited.
Figure 1D:
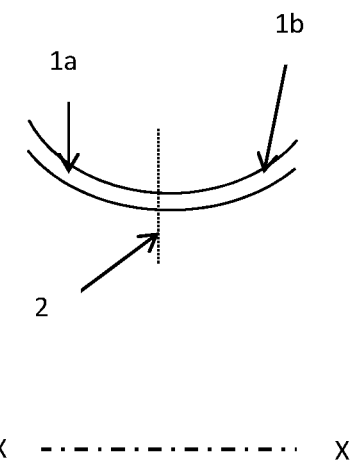
Figure 2A:
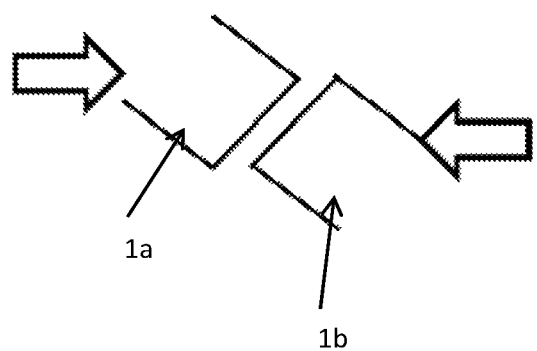
FIG. 2A shows schematically an example of a first known method.
Figure 2B:
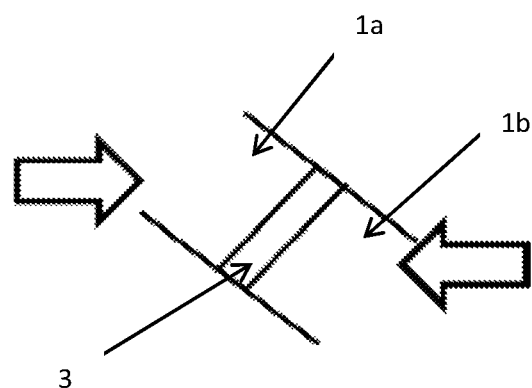
FIG. 2B shows schematically a disadvantage of the method FIG. 2A.

FIG. 2 illustrates a first problem which can arise using conventional friction welding methods to join pieces of end products represented in FIG. 1 (in the specific example, FIG. 1A.) The Figure shows two pieces 1a, 1b between which friction has been applied to generate heat causing plastic deformation at the facing end surfaces when a subsequent axial force is applied. The arrows show axial force being applied in the next stage of the friction welding process. As the pieces are not in parallel alignment with the direction of force, there is an uneven spread of force across the welding interface 3. Uneven radial upset is likely to result and consequently, the weld properties are likely to be unevenly distributed and the weld of unsatisfactory quality. This could be resolved with the introduction of an additional radial force, but such a force is difficult to introduce into a configuration where the interface is not orthogonal to the direction of the axial force.

Figure 3A:
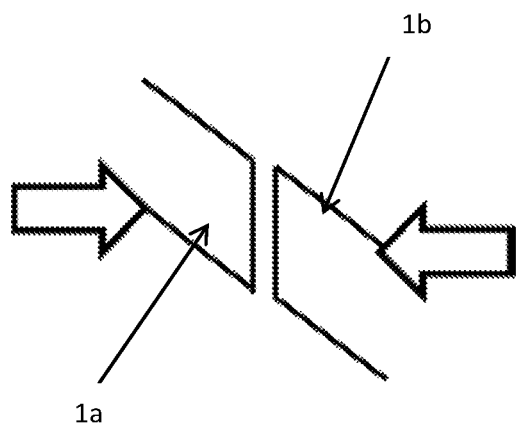
FIG. 3A shows schematically an example of a second known method.
Figure 3B:
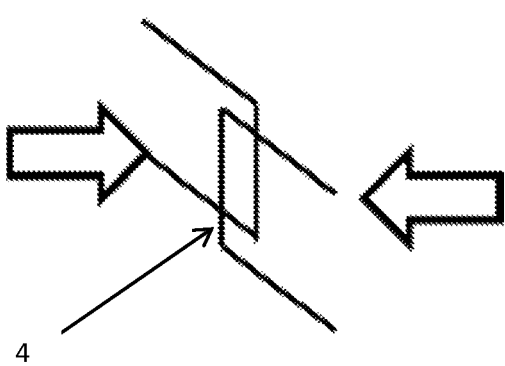
FIG. 3B shows schematically a disadvantage of the method of FIG. 3A.

In the arrangement of FIG. 3, the weld interface is oriented to be orthogonal to the axial force. Since the two pieces 1a, 1b are not coaxial with the axial force, there is a likelihood of slippage 4 along the plane of the weld interface during the plastic flow phase of the process. A consequence of this is that the pieces dig into each other rather than simply abut faces. A poor quality weld can be expected.

Figure 4A:
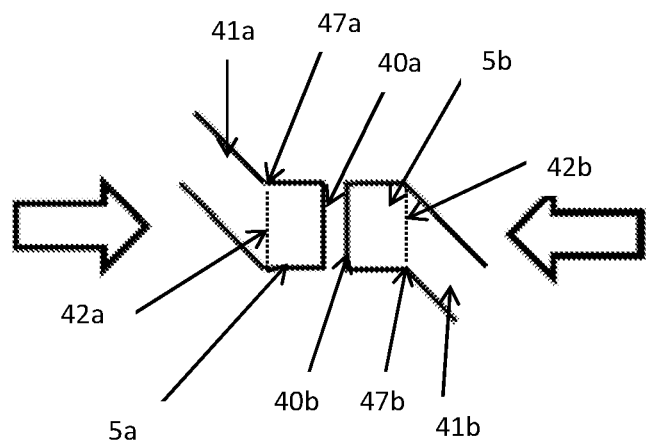
FIG. 4A shows schematically a first embodiment of the invention, prior to welding.

FIG. 4A shows two pieces configured for welding into a welded end product using methods in accordance with the invention. The pieces are intended to produce an end product with substantially the same geometry as shown in FIG. 1A and FIGS. 2 and 3. In FIG. 4, the pieces each have an end product geometry portion 41a and 41b and a sacrificial geometry portion 5a, 5b. For each piece, the two portions 41a, 5a; 41b, 5b meet at a vertex 47a, 47b. A plane 42a, 42b on each piece 41a, 41b passes through the vertex. The plane divides the end geometry portion 41a, 41b from the sacrificial geometry portion 5a, 5b.

Figure 4B:
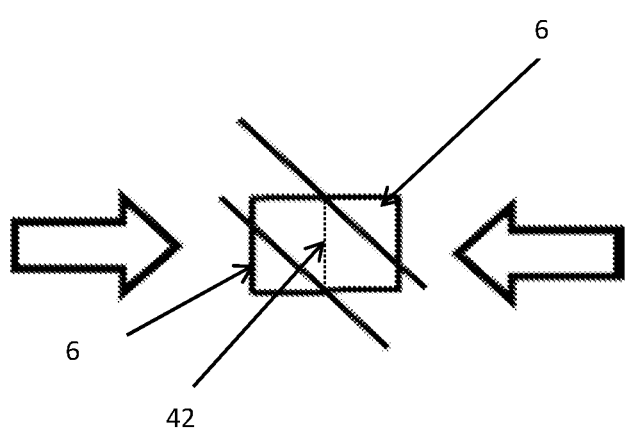
FIG. 4B shows schematically the embodiment of FIG. 4A after welding.

FIG. 4b shows the pieces after the application of mechanical friction to heat the interface surfaces 40a, 40b of the sacrificial geometry portions 5a, 5b and the application of an axial force (applied orthogonal to parallel planes 42a, 42b) in accordance with the invention to plastically deform the sacrificial geometry portions 5a, 5b. As can be seen, the sacrificial geometry portions 5a, 5b are squeezed out of the space between planes 42a and 42b (or "upset"). Since the planes 42a, 42b are orthogonal to the axial force, flashes 6 distribute radially evenly and a good quality weld can be produced. The planes 42a, 42b meet to form the weld interface 42 and once the weld has cooled, the flashes 6 can be removed by a subsequent machining process to provide the welded end product.

FIG. 5 shows an alternative configuration of pieces configured for welding into a welded end product using methods in accordance with the invention. The pieces are intended to produce an end product with substantially the same geometry as shown in FIG. 1A and FIGS. 2, 3 and 4. In FIG. 5A, the pieces each have an end product geometry portion 51a and 51b and a sacrificial geometry portion 55a, 55b. Much like the embodiment of FIG. 4, for each piece, the two portions 51a, 55a; 51b, 55b meet at a vertex 57a, 57b. The arrangement of FIG. 5 differs from FIG. 4 in that additional sacrificial geometry portions 58a, 58b are added to mirror the geometry of the piece across the axis XX (which corresponds to the direction of the applied axial force.) It will be noted the arrangement also has symmetry in a plane orthogonal to axis XX and passing between the sacrificial geometry portions 55a, 55b. A plane 52a, 52b on each piece 51a, 51b passes through the vertex.

Figure 5A:
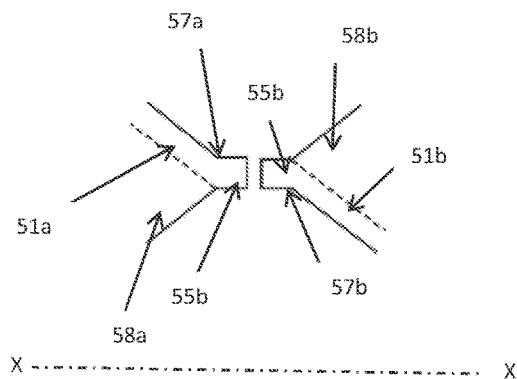
FIG. 5A shows schematically a second embodiment of the invention, prior to welding.
Figure 5B:
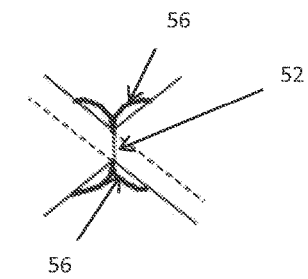
FIG. 5B shows schematically the embodiment of FIG. 5A after welding.

FIG. 5B shows the flashes 56 which result from this symmetrical arrangement. The symmetry provides for a more even heat and plastic flow and a good quality weld can be expected.

Figure 5C:
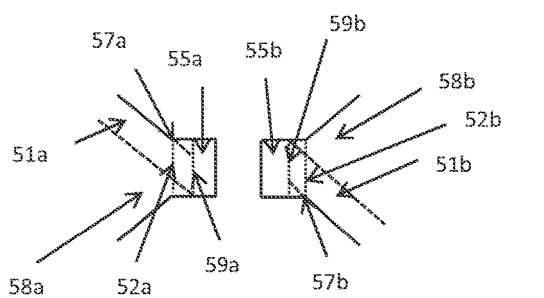
FIG. 5C shows schematically a third embodiment of the invention, prior to welding.
Figure 5D:
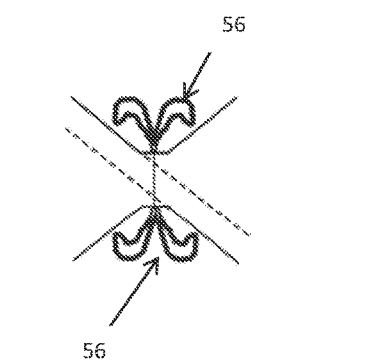
FIG. 5D shows schematically the embodiment of FIG. 5C after welding.
Figure 5E:
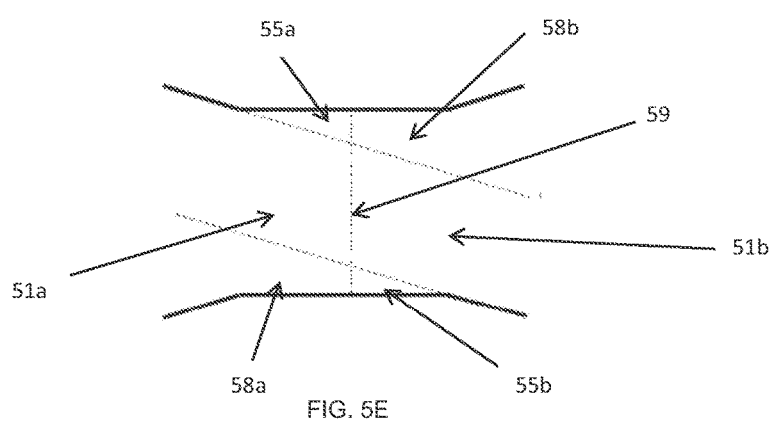
FIG. 5E shows schematically the embodiment of FIGS. 5C and 5D after welding and after the flash has been removed.

FIGS. 5C, 5D and 5E illustrate an arrangement very similar to that of FIGS. 5A and 5B. The arrangement differs slightly in that the sacrificial geometry portions 55a, 55b are enlarged to extend around an end plane 59a, 59b of the pieces 51a, 51b, the vertices 57a, 57b passing through planes which are parallel to but axially displaced from the planes 59a, 59b. End plane 59a, 59b, displaced axially from plane 52a, 52b divides the end geometry portion 51a, 51b from the sacrificial geometry portion 55a, 55b. During the welding process, sacrificial weld portion material is plastically deformed up to the second plane 59a, 59b. Remaining sacrificial geometry portion material 58a, 58b is removed post welding.

FIG. 5C shows the pieces prior to the introduction of mechanical friction, FIG. 5D shows the pieces after introduction of mechanical friction, consequent plastic deformation and application of axial force (along axis XX) steps. FIG. 5E shows the pieces welded together with the upsets removed. The remaining sacrificial geometry 55a, 55b, 58a, 58b (which has not been plastically deformed and upset during the friction welding operation) can be removed in a subsequent machining step to provide the welded end product whose outline is represented by the dotted lines and consists of the weld product geometry portions 51*a*, 51*b* whose planar ends 59*a*, 59*b* are welded at plane 59.

By comparison of FIGS. 5B and 5D, it can be seen that a pinching of flashes 56 in FIG. 5B which can impinge and impact negatively on the quality of the weld is avoided by extending the sacrificial geometry 55*a*, 55*b*, 58*a*, 58*b* as shown in FIG. 5C.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method for welding together pieces which form a curved or angled walled end product using a friction welding process comprising:
    providing first and second pieces which together define an end product geometry, each piece comprising an end product geometry portion and a sacrificial weld portion, the sacrificial weld portion extending from a surface of the end product geometry portion at an angle relative to the surface and terminating in a planar weld interface surface;
    arranging the pieces with their planar weld interface surfaces together at a weld surface interface and the sacrificial weld portions in coaxial alignment;
    applying mechanical friction between the planar weld interface surfaces;
    applying an axial force orthogonal to the weld surface interface sufficient to upset the sacrificial weld portions and bring together the end product geometry portions; and
    removing the sacrificial geometry portions to provide an end product.
2. The method as claimed in claim 1, wherein the angle is in the inclusive range of 110 to 160 degrees.
3. The method as claimed in claim 2, wherein the angle is in the inclusive range of 125 to 145 degrees.
4. The method as claimed in claim 3, wherein the angle is 135 degrees+/−2%.
5. The method as claimed in claim 1, wherein either or both of the first and second pieces have the end product geometry portion which is curved.
6. The method as claimed in claim 1, wherein the sacrificial weld portions exhibit symmetry across the weld surface interface.
7. The method as claimed in claim 1, wherein the sacrificial weld portions exhibit symmetry across a plane orthogonal to the weld surface interface.
8. The method as claimed in claim 1, wherein the sacrificial weld portion meets the surface of the end product geometry portion in a plane which defines an end of the sacrificial weld portion.
9. The method as claimed in claim 8, wherein the plane divides the sacrificial weld portion and the end product geometry portion.
10. The method as claimed in claim 8, wherein the plane is axially displaced from a second plane which defines an end of the end product geometry portion, not all of the sacrificial geometry portion being upset in the welding process.
11. The method as claimed in claim 1, wherein the steps of applying the mechanical friction and applying the axial force are undertaken using one of an inertia, a direct drive, and a hybrid rotary friction welding process.
12. The method as claimed in claim 1, wherein the first and second pieces are formed of different materials.
13. The method as claimed in claim 1, wherein each sacrificial weld portion is formed by machining the respective piece to include this portion.
14. The method as claimed in claim 1, wherein one or both sacrificial geometry portions are provided onto the end product geometry portions by build-up of a suitable material in a material addition process.
15. The method as claimed in claim 1, wherein the end product geometry is configured for a component of a gas turbine engine.
16. The method as claimed in claim 12, wherein the first and second pieces are formed of different alloys.

* * * * *